United States Patent Office 3,390,089
Patented June 25, 1968

3,390,089
LUBRICATING OIL CONTAINING
POLYMERIC ADDITIVE
Robert Tirtiaux, Rouen, and Roger Tourret, Mont-Saint-Aignan, France, assignors to Esso Research and Engineering Company, a corporation of Delaware
No Drawing. Application Nov. 13, 1963, Ser. No. 323,270, which is a continuation-in-part of application Ser. No. 240,424, Nov. 27, 1962. Divided and this application Oct. 21, 1966, Ser. No. 588,629
Claims priority, application France, Nov. 30, 1961, 880,559
10 Claims. (Cl. 252—56)

ABSTRACT OF THE DISCLOSURE

A lubricating oil of enhanced viscosity index is obtained by blending into a major proportion of a lubricating oil a minor, viscosity index improving amount, generally about 0.001 to 20 wt. percent based on the compounded lubricant, of an oil-soluble polymeric additive comprising a copolymer of at least one polymerizable ester of a saturated aliphatic monohydric alcohol of from 3 to 18 carbon atoms and an ethylenically unsaturated carboxylic acid having 1 to 2 carboxy groups and 3 to 4 carbon atoms, together with from 0.01 to 5.0 wt. percent based on the total weight of unsaturated esters, of a compound that is copolymerizable with said ester and that is characterized by having at least two vinylidene groups and that is selected from the class consisting of unsubstituted hydrocarbons and substituted hydrocarbons containing only carbon, hydrogen and oxygen. Representative unsaturated esters include esters of fumaric acid and of methacrylic acid, e.g. mixed fumarate esters of coconut oil alcohols or lauryl methacrylate. Representative compounds containing at least two vinylidene groups include divinyl benzene and divinyl succinate. A particularly effective copolymer is prepared from mixed $C_8$–$C_{18}$ alcohol fumarate, monobutyl acid maleate, dibutyl fumarate, vinyl acetate and divinyl benzene.

---

This application is a division of application Ser. No. 323,270, filed Nov. 13, 1963, and now abandoned, which in turn was a continuation-in-part of application Ser. No. 240,424, filed Nov. 27, 1962, and now abandoned.

The present invention relates to the preparation of polymeric additives for lubricating oils, and to lubricating oil compositions containing such additives.

There are generally added to the lubricating oils intended for the lubrication of internal combustion engines various additives that are designed to improve their properties, in particular with a view to making the oils detergent and to increasing their viscosity index, while lowering their pour point.

For this purpose, recourse is had in particular to oil-soluble products obtained by the polymerization or copolymerization of esters of ethylenically unsaturated carboxylic acids.

It is an object of the present invention to improve the properties of these polymers or copolymers, in particular as regards their effect on the viscosity index of lubricating oils.

According to the invention, a process for manufacturing a polymeric additive for lubricating oils by polymerizing at least one ester of an ethylenically unsaturated carboxylic acid to yield an oil-soluble polymeric product is characterized by adding to the polymerization mixture up to 20% by weight, based on the total polymerizable material, of a compound containing more than one vinylidene group.

Also according to the invention, a lubricating oil composition comprises from 0.001 to 20%, preferably 1 to 10%, by weight of a polymeric additive manufactured by such a process.

The esters of ethylenically unsaturated carboxylic acids may be either (1) complete esters of such acids and aliphatic alicyclic or aromatic alcohols, which alcohols may contain substituent groups such as alkoxy, trialkoxy, halogen, $NH_2$, $NO_2$, $HSO_3$ CN or other groups; or (2) partial esters of such acids having more than one carboxylic acid function, and such alcohols. In the partial esters the free acid function or functions may remain free or may be alkoxylated, e.g. by reaction with an alkylene oxide. In addition, one or more of these complete and/or partial esters may be copolymerized with further polymerizable organic compounds, such as:

(1) esters of ethylenically unsaturated alcohols and $C_2$ to $C_6$ carboxylic acids, such as vinyl esters, for instance vinyl acetate;
(2) aromatic hydrocarbons having ethylenically unsaturated side chains, such as styrene;
(3) ethylenically unsaturated nitriles, for instance acrylonitrile; or
(4) anhydrides of ethylenically unsaturated dicarboxylic acids, for instance maleic anhydride.

The polymerization of these esters or the copolymerization of these esters and/or mixtures of esters with the further polymerizable organic compounds, may be carried out by any of the well-known procedures.

The compound containing more than one vinylidene group may be a divinyl compound, for example a divinyl hydrocarbon such as divinyl benzene or butadiene-1,3; a divinyl ester of a dicarboxylic acid such as divinyl succinate; a divinyl acetal such as divinyl acetal; or a divinyl ether of a dihydric alcohol such as a divinyl ether of ethylene glycol or propylene glycol. Alternatively it may be a di- or polyester of acrylic acid or an α-substituted acrylic acid and a di- or polyhydric alcohol, or alkoxylated alcohol, such as a diacrylate or dimethacrylate of a glycol or alkoxylated glycol, for example, ethoxylated ethylene glycol dimethacrylate. Preferred compounds are divinyl benzene, divinyl succinate and ethylene glycol dimethacrylate.

The quantity of the compound containing more than one vinylidene group to be added to the polymerization mixture is preferably in the range of 0.01 to 5.0% by weight based on the total polymerizable material.

Preferably, the polymerization mixture comprises at least one ester of an ethylenically unsaturated carboxylic acid containing not more than 4 carbon atoms, e.g. acrylic, methacrylic, fumaric or maleic acid, and an aliphatic alcohol containing from 3 to 18 carbon atoms. Specific esters of this type include lauryl methacrylate, octadecyl maleate, stearyl acrylate, tallow alcohol fumarates, etc. The polymerization mixture may also include a vinyl ester of a saturated monocarboxylic acid containing from 2 to 6 carbons, e. g. vinyl acetate, vinyl propionate, vinyl butyrate. In particular, it may comprise at least one diester of fumaric or maleic acid and an aliphatic alcohol containing from 3 to 18 carbon atoms, at least one monoester of fumaric or maleic acid and such an alcohol, and the said vinyl ester. Examples of suitable alcohols containing from 3 to 18 carbon atoms are propyl, isopropyl, butyl, amyl, hexyl, octyl, decyl and lauryl alcohols, and alcohols derived from the hydrogenation of naturally occurring materials such as coconut oil, which alcohols contain from 8 to 18 carbon atoms, and tallow alcohols, which are principally $C_{16}$ to $C_{18}$ alcohols.

The coplymerization of the mixture may be accomplished by any of the classical processes of polymerization. However, the copolymerization is preferably effected in two stages, as described in the applicants' French Patent No. 1,228,353 and British Patent No. 906,412, the compound containing more than one vinylidene group being added to the charge to be polymerized in the first or the second stage, preferably the first stage.

The copolymers according to the invention have particularly interesting properties from the point of view of improving the viscosity index of lubricating oil compositions. They likewise improve the pour point and make oils detergent. They also have the advantage of being capable of use for the various basic oils prepared synthetically or obtained from various paraffinic, naphthenic or asphaltic oils or from mixed-base oils, whether of mineral, vegetable or animal origin. When copolymers are prepared the relative proportions of monomers used will be dictated by the properties desired. The choice of the proportions can be determined by knowledge of the prior art and is limited only by the requirement that the copolymer be oil-soluble. The synthetic oils may be hydrocarbon oils or they may be oils of the ester type, as for example di-2-ethylhexyl sebacate or the like. The final polymers may have molecular weights in the range of from about 5,000 to about 1,000,000. The molecular weight can be determined by measuring the viscosity of solutions containing 5 milligrams of the polymer per cubic centimeter in diisobutylene and then applying the Staudinger equation. Particularly preferred when the polymers are primarily intended as V.I. improvers are molecular weights of about 50,000 to about 1,000,000. Polymers having multifunctional properties, i.e. detergent or dispersant properties as well as viscosity index improving properties may range in molecular weight from about 5,000 to 1,000,000. For convenience in blending at the termination of the polymerization reaction, the polymer may be diluted with a light mineral oil to give a concentrate of the polymer.

The following examples will better show the scope and importance of the invention.

Example 1

Copolymers were prepared by copolymerizing a mixture of: mixed fumarates of $C_8$ to $C_{18}$ alcohols derived from coconut oil, of molecular weight 190; monobutyl acid maleate; dibutyl fumarate, and vinyl acetate; with and without the addition of divinylbenzene, in the proportions shown in Table I. All the figures for the monomer proportions are expressed as percent by weight of total monomers.

Copolymerization was accomplished in two stages, the addition of the divinylbenzene taking place in the second stage or in the first stage, as indicated.

Polymerization was effected at 80° C. in the presence of azo-di-iso-butyronitrile as catalyst.

In each case 24% of unreacted vinyl acetate was recovered by vacuum distillation after the second stage.

The copolymers thus obtained had the following characteristics when diluted to about 40% in a dilution oil:

| Additive (40% dilution) | A | $B_1$ | $B_2$ | $B_3$ |
|---|---|---|---|---|
| Viscosity at 50° C. (122° F.), stokes | 37 | 50 | 64 | 94 |
| Viscosity at 99° C. (210° F.), Stokes | 5.7 | 9 | 13.7 | 16.8 |

The efficacy of these copolymers as viscosity index improvers was then compared at a concentration of 2.4% in a conventional petroleum lubricating oil having a viscosity at 99° C. (210° F.) of 6.7 cs. (48 SSU), with the following results:

| Additive (2.4% solution) | A | $B_1$ | $B_2$ | $B_3$ |
|---|---|---|---|---|
| Viscosity at 99° C. (210° F.), cs | 6.7 | 11.2 | 13.2 | 12.8 | 16.5 |
| Viscosity at 99° C. (210° F.), SSU | 48 | 63.6 | 71 | 69.5 | 83.7 |
| Viscosity index | 112 | 135.5 | 139.5 | 140 | 142 |
| Pour Point, ° C | −9 | −33 | −33 | −33 | −33 |

It is clear from these results that the copolymers $B_1$, $B_2$ and $B_3$, which contain in the copolymer a compound containing two vinylidene groups, namely divinyl benzene, confer improved viscosity indexed on lubricating oil compositions, compared with the copolymer A which does not contain such a compound. The pour point of the oil is unaffected.

Example 2

Copolymers were prepared by copolymerizing a mixture of 60% by weight of the mixed fumarates of $C_8$ to $C_{18}$ alcohols used in Example 1, and 40% by weight of vinyl acetate, with and without the addition of 0.25% by weight of divinyl succinate. Copolymerization was carried out in a single stage at 80° C. in the presence of 0.1% azodiisobutyronitrile. At the end of the process, 24% vinyl acetate was recovered after distillation.

The copolyers thus obtained with and without the addition of divinyl succinate had, when diluted to 40% in the dilution oil, viscosities at 50° C. (122° F.) of 68.4 and 67 stokes, respectively.

The efficacy of these copolymers as viscosity index improvers was then compared at a concentration of 2.4% in the same oil as in Example 1, with the following results:

| Additive Prepared | Without Divinyl Succinate | With Divinyl Succinate |
|---|---|---|
| Viscosity at 99° C. (210° F.), cs | 14.3 | 16.8 |
| Viscosity index | 137 | 140 |
| Pour point, ° C | −36 | −96 |

Example 3

A polymer of lauryl methacrylate, and a copolymer of lauryl methacrylate and ethylene glycol dimethacrylate, were prepared by polymerizing lauryl methacrylate alone, and by copolymerizing 99.5% by weight lauryl methacrylate and 0.5% by weight ethylene glycol dimethacrylate, under the same conditions as in Example 2.

The polymer and copolymer thus obtained had, when diluted to 40% in the dilution oil, viscosities at 50° C. (122° F.) of 21.5 and 26 stokes, respectively.

The efficacy of these as viscosity index improvers was then compared at a concentration of 2.4% in the same oil as in Examples 1 and 2, with the following results:

TABLE I

| | Copolymer | | | | | | | |
|---|---|---|---|---|---|---|---|---|
| | A | | $B_1$ | | $B_2$ | | $B_3$ | |
| Stage | 1 | 2 | 1 | 2 | 1 | 2 | 1 | 2 |
| $C_5$–$C_{18}$ fumarate | 15 | 39.2 | 15 | 39.8 | 15 | 39.8 | 15 | 39.8 |
| Monobutyl acid maleate | 1.2 | | 1.2 | | 1.2 | | 1.2 | |
| Dibutyl fumarate | | 4 | | 4 | | 4 | | 4 |
| Vinyl acetate | 15 | 25 | 15 | 25 | 15 | 25 | 15 | 25 |
| Divinyl benzene | | | | 0.067 | | 0.1 | | 0.067 |
| Polymerization period (hours) | 2 | 4 | 2 | 4 | 2 | 4 | 2 | 4 |

| Additive Prepared | Without Dimethacrylate | With Dimethacrylate |
|---|---|---|
| Viscosity at 99° C. (220° F.), cs | 11.5 | 12.4 |
| Viscosity index | 136 | 138 |
| Pour point, ° C | −33 | −33 |

It is clear from these results also that the copolymers which contain a compound containing two vinylidene groups, namely divinyl succinate or ethylene glycol dimethacrylate, confer improved viscosity indexes on lubricating oil compositions compared with a polymer or copolymer which does not contain such a compound.

What is claimed is:

1. A lubricating oil composition of improved viscosity index which comprises a major proportion of a lubricating oil and a minor, viscosity index improving amount of an oil-soluble polymeric additive of Staudinger molecular weight within the range of about 5,000 to 1,000,000 which has been prepared by heating for a period of time sufficient to form said oil-soluble polymeric additive, at least one polymerizable ester of a saturated aliphatic monohydric alcohol of from 3 to 18 carbon atoms and an ethylenically unsaturated carboxylic acid having 1 to 2 carboxy groups and 3 to 4 carbon atoms, together with from 0.01 to 5.0 weight percent, based on the total weight of unsaturated esters, of a compound that is copolymerizable with said ester and that is characterized by having at least two vinylidene groups and that is selected from the class consisting of unsubstituted hydrocarbons and substituted hydrocarbons containing only carbon, hydrogen and oxygen.

2. Lubricating oil composition as defined by claim 1 wherein the concentration of said polymeric additive in said composition is in the range of about 0.001 to 20 weight percent based on said composition.

3. Lubricating oil composition as defined by claim 1 wherein said copolymerizable compound is divinyl benzene.

4. Lubricating oil composition as defined by claim 1 wherein said copolymerizable compound is divinyl succinate.

5. Lubricating oil composition as defined by claim 1 wherein said copolymerizable compound is ethylene glycol dimethacrylate.

6. Lubricating oil composition as defined by claim 1 wherein said polymerizable ester is an ester of fumaric acid.

7. Lubricating oil composition as defined by claim 1 wherein said polymerizable ester is an ester of methacrylic acid.

8. Lubricating oil composition as defined by claim 1 wherein said polymerizable ester includes lauryl methacrylate and said copolymerizable compound includes ethylene glycol dimethacrylate.

9. A lubricating oil composition of improved viscosity index which comprises a major proportion of a lubricating oil and a minor, viscosity index improving amount of an oil-soluble polymeric additive of Staudinger molecular weight within the range of about 5,000 to 1,000,000 which has been prepared by heating together, for a period of time sufficient to form said oil-soluble polymeric additive, a mixture of (A) at least one ester of a saturated aliphatic alcohol containing from 3 to 18 carbon atoms and an acid selected from the group consisting of acrylic, methacrylic, fumaric and maleic acids, (B) a vinyl alcohol ester of a saturated monocarboxylic acid containing from 2 to 6 carbon atoms and (C) from about 0.01 to 5.0 weight percent, based on the total weight of (A) plus (B), of a divinyl compound selected from the class consisting of unsubstituted hydrocarbons and substituted hydrocarbons containing only carbon, hydrogen and oxygen, the proportion of (A) to (B) being within the range of about equal parts by weight to about 60 parts of (A) and 40 parts of (B).

10. A lubricating oil composition as defined by claim 9 wherein, in the preparation of said polymeric additive, (A) includes a mixture of $C_8$ to $C_{18}$ aliphatic alcohol esters of fumaric acid, (B) is vinyl acetate, and (C) is divinyl benzene.

References Cited

UNITED STATES PATENTS

| | | | |
|---|---|---|---|
| 2,125,885 | 8/1938 | Bruson | 252—56 X |
| 2,202,846 | 6/1940 | Garvey | 260—78 |
| 2,375,516 | 5/1945 | Blair | 252—56 |
| 2,671,760 | 3/1954 | Port et al. | 252—56 |
| 3,244,631 | 4/1966 | Voort | 252—56 |
| 3,251,772 | 5/1966 | Schreiber | 252—56 X |
| 3,313,733 | 4/1967 | Vries | 252—56 X |

DANIEL E. WYMAN, *Primary Examiner.*

W. H. CANNON, *Assistant Examiner.*